J. A. SAMUELS.
KETTLE.
APPLICATION FILED JULY 6, 1920.

1,407,088.

Patented Feb. 21, 1922.

Witnesses.
W. E. P. Bayly
G. W. Bayly.

Inventor:
John Alexander Samuels,
per John Pitt Bayly.
Attorney.

UNITED STATES PATENT OFFICE.

JOHN ALEXANDER SAMUELS, OF RICHMOND, ENGLAND.

KETTLE.

1,407,088.                     Specification of Letters Patent.      Patented Feb. 21, 1922.

Application filed July 6, 1920. Serial No. 394,355.

*To all whom it may concern:*

Be it known that I, JOHN ALEXANDER SAMUELS, a subject of the King of Great Britain, residing at 24 St. Mary's Grove, Richmond, in the county of Surrey, in England, have invented new and useful Improvements in Kettles, of which the following is a specification.

The invention relates to kettles for boiling water for domestic use.

Figure 1:
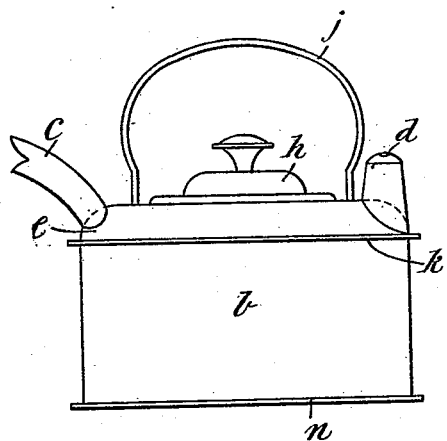
Figure 2:
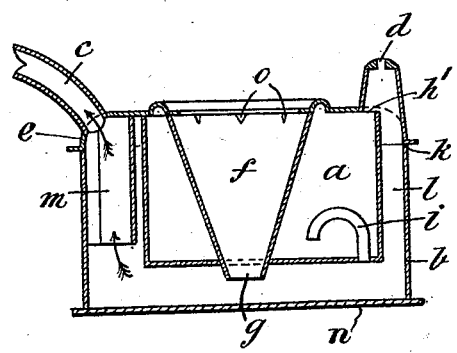
Figure 3:
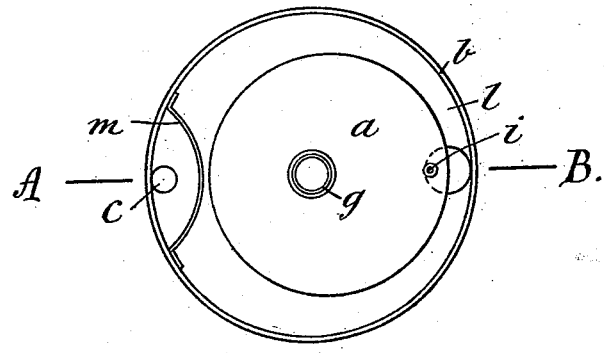

In the accompanying drawings, Fig. 1, is a side elevation of the kettle; Fig. 2, is a vertical section of the kettle on line A, B of Fig. 3, (the handle not shown,) and Fig. 3, is a plan of the kettle with the bottom removed.

My invention consists of a kettle constructed with an inner receptacle $a$ and an outer receptacle $b$ to contain water which is required to be heated. The outer receptacle $b$ is of the usual shape having a spout $c$, also a safety valve $d$. The inner receptacle $a$ is fixed to the top $e$ of the kettle by means of a vertical hopper $f$ through which the kettle is filled with water; the said hopper $f$ is provided with an outlet $g$ at the bottom, and the usual cover $h$ at the top. The water required to be boiled passes through the hopper $f$ into the outer receptacle $b$ filling the same. The water then flows through a syphon $i$ into the inner receptacle $a$. The inner receptacle $a$ is supported by the vertical hopper $f$ being fixed to the top $e$ of the kettle having a circular (or thereabouts) cavity between the underside of the top $e$ of the kettle and the top rim $h'$ of the inner receptacle $a$. The aforesaid kettle is provided with the usual handle $j$. The periphery of the top $e$ of the kettle is fixed to the top rim $k$ of the outer receptacle $b$.

A water passage $l$ is formed between the outside of the inner receptacle $a$, and the inside of the outer receptacle $b$ as shown in Fig. 2, also a division $m$ is provided between the side walls of the two receptacles $a$, and $b$, for conveying the water to the outlet spout $c$, the water travelling to the said outlet spout $c$ as indicated by arrows in Fig. 2, in order to allow the free flow of the water from the kettle above described. Also the hopper $f$ at the top is provided with perforations $o$ for the free circulation of the water.

I claim:

A kettle of the type set forth comprising an inner receptacle and an outer receptacle having a spout and a safety valve, the inner receptacle fixed to the top of the kettle by a vertical perforated hopper the said hopper having an outlet at the bottom and the usual cover at the top, the inner receptacle having a syphon in order to fill the said receptacle, the inner receptacle supported by the vertical hopper, the top rim of the outer receptacle fixed to the top of the kettle, and a passage for conveying the water to the spout, substantially as described.

JOHN ALEXANDER SAMUELS.